United States Patent
Mochida

(10) Patent No.: US 10,830,413 B2
(45) Date of Patent: Nov. 10, 2020

(54) LUMINOUS FLUX CONTROL MEMBER, LIGHT EMITTING DEVICE, SURFACE LIGHT SOURCE DEVICE, AND DISPLAY DEVICE

(71) Applicant: ENPLAS CORPORATION, Kawaguchi (JP)

(72) Inventor: Toshihiko Mochida, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/629,510

(22) PCT Filed: Jul. 10, 2018

(86) PCT No.: PCT/JP2018/025952
§ 371 (c)(1),
(2) Date: Jan. 8, 2020

(87) PCT Pub. No.: WO2019/013183
PCT Pub. Date: Jan. 17, 2019

(65) Prior Publication Data
US 2020/0124249 A1 Apr. 23, 2020

(30) Foreign Application Priority Data

Jul. 14, 2017 (JP) .................... 2017-138313

(51) Int. Cl.
*F21V 5/04* (2006.01)
*F21S 41/25* (2018.01)
(Continued)

(52) U.S. Cl.
CPC ............ *F21V 5/04* (2013.01); *F21S 41/25* (2018.01); *G02B 3/02* (2013.01); *F21Y 2101/00* (2013.01); *F21Y 2115/10* (2016.08)

(58) Field of Classification Search
CPC ......... F21V 5/04; G02B 3/02; G02B 19/0014; F21S 41/25; F21Y 2115/10; F21Y 2101/00; G09F 13/04; G09F 9/35
See application file for complete search history.

(56) References Cited

U.S. PATENT DOCUMENTS

2014/0009944 A1   1/2014  Fukuda
2014/0078746 A1 * 3/2014  Caldwell ............ G02B 19/0028
                                                       362/309
(Continued)

FOREIGN PATENT DOCUMENTS

CN    103527974        1/2014
JP    4182783 B2  *  11/2008  ......... G02B 19/0061
(Continued)

OTHER PUBLICATIONS

Machine English Translation of JP2011034799A, Takeuchi Hldehito et al. Feb. 17, 2011 (Year: 2011).*

(Continued)

*Primary Examiner* — Isiaka O Akanbi
*Assistant Examiner* — Glenn D Zimmerman
(74) *Attorney, Agent, or Firm* — Hamre, Schumann, Mueller & Larson, P.C.

(57) ABSTRACT

The present invention provides a lens for a light emitting element (a luminous flux control member) that can ensure sufficient spread of light even with a smaller number of light emitting elements. The luminous flux control member (10) of the present invention includes: a dome shaped aspherical lens body (11). The lens body (11) includes: a base surface (13); and a dome shaped curved surface (12). The base surface (13) has a base concave portion (131) centered on a central axis, a concave surface of the base concave portion (131) has a light incident region for incident light emitted from a light emitting element, the dome shaped curved surface (12) has a light emitting region for emitting incident (Continued)

light from the light incident region to an outside, the light emitting region of the curved surface (12) has an elliptical shape as viewed from a central axis direction centered on the central axis, in which a length (X) of an X axis orthogonal to the central axis and a length (Y) of a Y axis orthogonal to the central axis and the X axis satisfy X<Y, the light emitting region of the curved surface has a pair of first concave portions (121) on both sides with the central axis interposed therebetween in a cross section including the X axis and the central axis, and the light emitting region of the curved surface has a second concave portion (122) on the central axis in a cross section including the Y axis and the central axis.

15 Claims, 8 Drawing Sheets

(51) Int. Cl.
*G02B 3/02* (2006.01)
*F21Y 115/10* (2016.01)
*F21Y 101/00* (2016.01)

(56) References Cited

U.S. PATENT DOCUMENTS

2015/0276170 A1* 10/2015 Motoyanagi .............. F21V 5/04
362/335
2018/0172238 A1* 6/2018 Camras ................... F21S 43/26

FOREIGN PATENT DOCUMENTS

| JP | 2011-034799 | 2/2011 |
| JP | 2012-212574 | 11/2012 |
| JP | 2013-218940 | 10/2013 |
| JP | 2016-024326 | 2/2016 |
| WO | 2016/196039 | 12/2016 |

OTHER PUBLICATIONS

International Search Report issued in International Application No. PCT/JP2018/025952, dated Oct. 2, 2018, 4 pages.
Office Action issued in corresponding Chinese Patent Application No. 201880046343.8, dated Jun. 28, 2020, 13 pages with translation.

* cited by examiner

Top view

Side view in X axis

Side view in Y axis

Cross sectional view taken along line I-I

Bottom view

Cross sectional view taken along line II-II

Cross sectional view
taken along line I-I

Cross sectional view
taken along line II-II

LUMINOUS FLUX CONTROL MEMBER, LIGHT EMITTING DEVICE, SURFACE LIGHT SOURCE DEVICE, AND DISPLAY DEVICE

TECHNICAL FIELD

The present invention relates to a luminous flux control member, which is a lens for controlling distribution of light emitted from a light emitting element typified by an LED, a light emitting device, a surface light source device, and a display device.

BACKGROUND ART

In a display device such as a liquid crystal display device, a backlight that is a surface light source device for emitting light to a display panel is disposed. As the backlight, for example, a light emitting element substrate on which light emitting elements such as LEDs are disposed is used. In the light emitting element substrate, a plurality of light emitting elements are disposed at predetermined intervals, and lenses for diffusing light emitted from the light emitting elements are disposed so as to cover the light emitting elements. The backlight includes a plurality of light emitting element rows in accordance with the size of the display device, and the plurality of light emitting element rows are disposed so that the light emitting element rows are parallel to each other at predetermined intervals (Patent Literature 1).

CITATION LIST

Patent Literature

Patent Literature 1: JP 2011-034799 A

SUMMARY OF INVENTION

Technical Problem

However, when the light emitting elements are arranged in a matrix with equal pitches in vertical and horizontal directions in order to uniformly illuminate the entire display panel having a freely-determined size, the number of the light emitting elements and the number of substrates on which the light emitting elements are disposed increase, or a large substrate on which a plurality of light emitting elements arranged in a matrix can be disposed is required, resulting in high cost. On the other hand, with respect to a display panel having the same freely-determined size, when the light emitting elements are arranged so as to increase the distance between the light emitting element rows disposed in parallel to widen either the vertical or horizontal pitch and the total number of the light emitting element rows is reduced, cost reduction can be achieved, but sufficient light spreading cannot be ensured. Specifically, there is a problem that dark spots due to an insufficient amount of light are caused between the light emitting element rows by increasing the distance between the light emitting element rows, resulting in deterioration in the performance of the display device. Not only the LEDs but also other light emitting devices have the same problem.

It is therefore an object of the present invention to provide a lens for a light emitting element, that is, a luminous flux control member, that can ensure a sufficient spread of light even with a smaller number of light emitting elements.

Solution to Problem

In order to achieve the above object, the present invention provides a luminous flux control member including: a dome shaped aspherical lens body, wherein the lens body includes: a base surface; and a dome shaped curved surface. The base surface has a base concave portion centered on a central axis and a concave surface of the base concave portion has a light incident region for incident light emitted from a light emitting element. The dome shaped curved surface has s light emitting region for emitting incident light from the light incident region to an outside. The light emitting region of the curved surface has an elliptical shape as viewed from a central axis direction centered on the central axis, in which a length (X) in an X-axis direction orthogonal to the central axis and a length (Y) in a Y-axis direction orthogonal to the central axis and an X axis satisfy X<Y. The light emitting region of the curved surface has a pair of first concave portions on both sides with the central axis interposed therebetween in a cross section including the X axis and the central axis. The light emitting region of the curved surface has a second concave portion on the central axis in a cross section including a Y axis and the central axis.

The present invention also provides a light emitting device including: a light emitting element; and a luminous flux control member, wherein the luminous flux control member is the luminous flux control member according to the present invention, and the luminous flux control member is disposed so as to cover the light emitting element.

The present invention also provides a surface light source device including: a light emitting device; and a light diffusion member, wherein the light emitting device is the light emitting device according to the present invention.

The present invention also provides a display device including: a surface light source device; and a member to be irradiated with light emitted from the surface light source device, wherein the surface light source device is the surface light source device according to the present invention.

Advantageous Effects of Invention

The luminous flux control member of the present invention has the above-described configuration, whereby the degree of refraction for spreading light can be made greater in the Y-axis direction than that in the X-axis direction. Thus, for example, by disposing the luminous flux control members of the present invention so that the Y-axis directions thereof are along the direction in which the spread of light is required, rather than increasing the number of the light emitting elements, the spread of light can be ensured. Furthermore, as described above, when the number of the light emitting element rows disposed in parallel is reduced, it is required to increase the distance between the light emitting element rows. However, by disposing the luminous flux control members of the present invention so that the Y-axis directions thereof are along the direction in which the distance between the light emitting element rows is increased (perpendicular to the light emitting element rows), it is possible to further spread the light in the direction in which the distance between the light emitting element rows is increased. Therefore, for example, even when the number of the light emitting element rows is reduced, the light can be spread to a region where the amount of light is insufficient, thereby suppressing the dark spots to be caused.

BRIEF DESCRIPTION OF DRAWINGS

FIG. 4A is a plan view of a mounting substrate on which light emitting elements are disposed. FIG. 4B is a plan view of the mounting substrate on which luminous flux control members are further disposed.

DESCRIPTION OF EMBODIMENTS

Figure 1A:
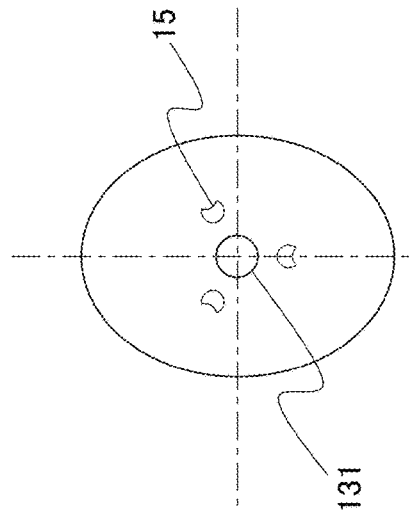
FIG. 1A is a top view of a luminous flux control member 10 according to the first embodiment.

In the luminous flux control member of the present invention, for example, the degree of refraction for spreading light is greater in the Y-axis direction than in the X-axis direction.

In the luminous flux control member of the present invention, for example, the light emitting region has an apex on the central axis in a cross section including the X axis and the central axis.

In the luminous flux control member of the present invention, for example, in the light emitting region, a distance from the base surface to each portion satisfies the following conditions (1) and (2):

$$L_{Y0} < L_{Y1} = L_{Y1'} \quad (1)$$

$$L_{Y0} = L_{X0} \quad (2)$$

$L_{Y0}$: a vertical distance from an intersection point of the central axis and the light emitting region to the base surface in a cross section including the Y axis and the central axis;
$L_{Y1}$ and $L_{Y1'}$: vertical distances from apexes present at symmetrical positions about the central axis to the base surface in a cross section including the Y axis and the central axis; and $L_{X0}$: a vertical distance from the intersection point of the central axis and the light emitting region to the base surface in a cross section including the X axis and the central axis.

In the luminous flux control member of the present invention, for example, the pair of first concave portions in the light emitting region are in the shape of symmetrical arcs about the Y axis in which openings face each other as viewed from the central axis direction.

In the luminous flux control member of the present invention, for example, the pair of first concave portions in the light emitting region do not exist on the Y axis.

In the luminous flux control member of the present invention, for example, the lens body further includes a leg portion, and the leg portion is disposed on the base surface so as to project in a direction opposite to the curved surface.

The light emitting device of the present invention further includes, for example, a mounting substrate, wherein the light emitting element is disposed on the mounting substrate, and the light emitting element is covered with the luminous flux control member.

The light emitting device of the present invention includes, for example, a plurality of the light emitting elements; and a plurality of the luminous flux control members, wherein the plurality of the light emitting elements are disposed linearly on the mounting substrate at intervals to form at least one light emitting element row, each of the plurality of the light emitting elements is covered with each of the plurality of the luminous flux control members, and a Y-axis direction of each of the plurality of the luminous flux control members is orthogonal to a row direction of the light emitting element row.

In the light emitting device of the present invention, for example, the luminous flux control member is a member for distributing light from the light emitting element in a deformed shape, and the light emitting element is an element that emits isotropic light.

In the surface light source device of the present invention, for example, the light emitting device is the light emitting device according to the present invention, the light emitting device includes a plurality of the light emitting element rows, and the plurality of the light emitting element rows are disposed so that their row directions are parallel to each other.

In the display device of the present invention, for example, the member to be irradiated is a display panel. As a specific example, the member to be irradiated is a liquid crystal panel or the like.

The luminous flux control member of the present invention is a lens that receives light emitted from a light emitting element disposed on a mounting substrate and outputs the light to the outside, and is used, for example, for a backlight. Thus, the luminous flux control member of the present invention can also be referred to as, for example, a lens for a light emitting element of a backlight. The light emitting element is not particularly limited, and may be, for example, an LED or the like.

Embodiments of the luminous flux control member and the light emitting device of the present invention will be described below with reference to the drawings. In the drawings, identical parts are indicated with identical reference signs. The present invention is in no way limited or restricted by the following embodiments. In each embodiment, reference can be made to the description of other embodiments. While an LED is exemplified as a light emitting element to which the luminous flux control member of the present invention is to be disposed in the following embodiments, the present invention is not limited thereto, and the present invention can also be applied to a point light source-light emitting element other than the LED.

First Embodiment

Figure 1D:
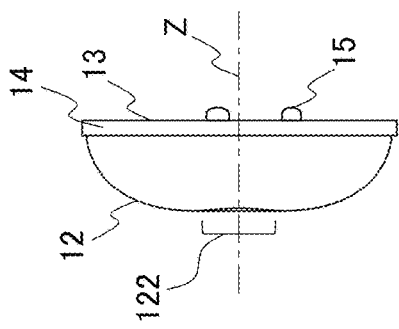
FIG. 1D is a side view in the X axis direction.
Figure 1B:
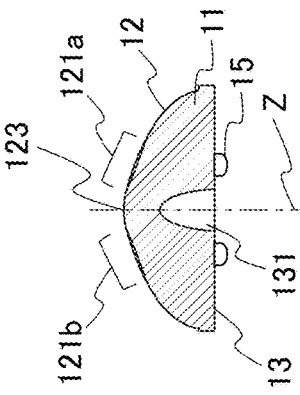
FIG. 1B is a side view in the Y axis direction.
Figure 1E:
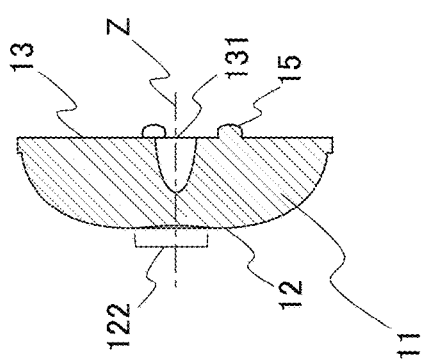
FIG. 1E is a cross-sectional view taken along the line I-I.
Figure 1C:
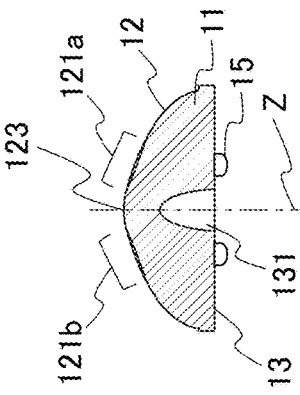
FIG. 1C is a bottom view.
Figure 1F:
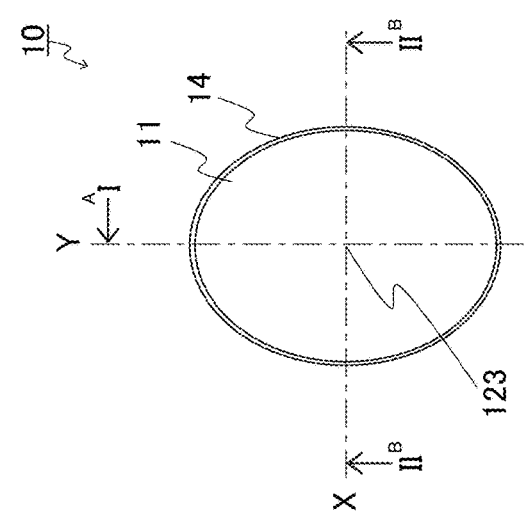
FIG. 1F is a cross-sectional view taken along the line II-II.

FIGS. 1A to 1F show an example of a luminous flux control member according to the present invention. FIG. 1A is a plan view of a luminous flux control member 10 as viewed from above, FIG. 1C is a plan view as viewed from below, FIG. 1B is a side view in the Y axis direction, FIG. 1D is a side view in the X axis direction, FIG. 1E is a cross-sectional view taken along the line I-I of FIG. 1A, and FIG. 1F is a cross-sectional view taken along the line II-II of FIG. 1A. As to the luminous flux control member 10, in the plan view of FIG. 1A, the short axis is the X axis, the long axis is the Y axis, an intersection point 123 of the X axis and the Y axis is the center, and the axis passing through the center and perpendicular to the X axis and the Y axis is the central axis Z. The central axis Z is also referred to as an optical axis when the luminous flux control member 10 is disposed so as to cover the light emitting element and light from the light emitting element enters.

The luminous flux control member 10 includes a dome shaped aspherical lens body 11. In the luminous flux control member 10, the lens body 11 includes a base surface 13 and a dome shaped curved surface 12. The base surface 13 of the lens body 11 has a base concave portion 131 centered on the central axis Z.

The luminous flux control member 10 may further include a leg portion 15 on the base surface 13 of the lens body 11, for example. The leg portion 15 is disposed, for example, on the base surface 13 so as to project in a direction opposite to the curved surface 12. In FIGS. 2A to 9, the leg portion is not shown.

The luminous flux control member 10 may include a flange 14, for example, on a side of the lens body 11 between the curved surface 12 and the base surface 13. In the luminous flux control member 10, the flanges 14 on the side can act as, for example, a grip when the luminous flux control member 10 is handled. In the luminous flux control member 10, for example, a gate may remain on the side. The gate is, for example, a bump remaining on the side of the luminous flux control member 10 when a plurality of luminous flux control members 10 are simultaneously molded and each luminous flux control member 10 is cut from the thus molded body in which the plurality of luminous flux control members 10 are connected.

The base concave portion 131 of the lens body 11 serves as a region covering the light emitting element when the luminous flux control member 10 is disposed on the mounting substrate of the light emitting element. When light is emitted from the light emitting element, the concave surface (inner surface) of the base concave portion 131 mainly serves as a light incident region for incident light emitted from the light emitting element.

The curved surface 12 of the lens body 11 has a light emitting region for emitting incident light from the light incident region of the base concave portion 131 to the outside, and for example, the entire region of the curved surface 12 is the light emitting region.

As shown in FIGS. 1A to 1F, the curved surface 12 (i.e., the light emitting region) has an elliptical shape centered on the central axis Z as viewed from the central axis Z direction. Specifically, the length (X) of the X axis orthogonal to the central axis Z and the length (Y) of the Y axis orthogonal to the central axis Z and the X axis satisfy X<Y. The curved surface 12 (the light emitting region) has a pair of first concave portions 121 (121a, 121b) on both sides with the central axis Z interposed therebetween in a cross section including the X axis and the central axis Z (hereinafter, also referred to as an X-axis cross section) as shown in FIG. 1F, and has a second concave portion 122 on the central axis Z in a cross section including the Y axis and the central axis Z (hereinafter, also referred to as a Y-axis cross section) as shown in FIG. 1E.

Figure 2A:
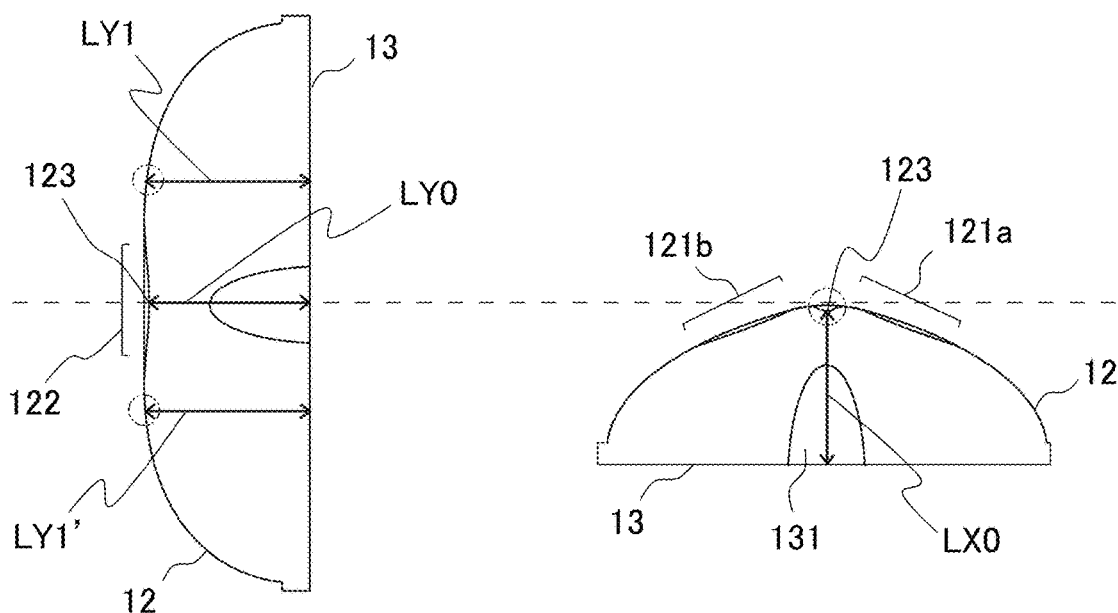
FIG. 2A is a cross-sectional view of the luminous flux control member 10 according to the first embodiment taken along the line I-I of FIG. 1A.
Figure 2B:
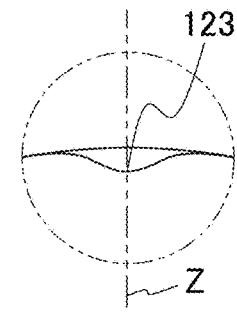
FIG. 2B is a cross-sectional view taken along the direction II-II of FIG. 1A.

The first concave portions 121 and the second concave portion 122 in the light emitting region will be described with reference to FIGS. 2A and 2B. FIG. 2A is an enlarged view of a cross section (same as FIG. 1E) taken along the line I-I of FIG. 1A. FIG. 2B shows a variation of FIG. 1F, specifically, shows an enlarged view of a cross section taken along the line II-II of FIG. 1A and an enlarged view of a dotted line region including the intersection point 123. In each of FIGS. 2A and 2B, a site surrounded by a dotted circle indicates an apex in each cross section, and hatching of the cross section is not shown.

As shown in FIGS. 1E and 2A, in the Y-axis cross section including the central axis Z, the curved surface 12 has a second concave portion 122 on the central axis Z. Thus, in the Y-axis cross section, the apex of the curved surface 12 (i.e., the site having the longest distance from the base surface 13) does not exist at the intersection point 123 of the curved surface 12 and the central axis Z, but exists in the regions on both sides with the intersection point 123 interposed therebetween. That is, in the light emitting region, the distance from the base surface 13 to each portion in the Y-axis cross section satisfies the following condition (1). In the following condition (1), $L_{Y0}$ is a vertical distance from the intersection point 123 of the central axis Z and the light emitting region (curved surface 12) to the base surface 13 in the Y-axis cross section. In the following condition (1), $L_{Y1}$ and $L_{Y1'}$ are vertical distances from apexes present at symmetrical positions about the central axis Z to the base surface 13 in the Y-axis cross section.

$$L_{Y0} < L_{Y1} = L_{Y1'} \quad (1)$$

On the other hand, as shown in FIGS. 1F and 2B, in the X-axis cross section including the central axis Z, the curved surface 12 has a pair of first concave portions 121 (121a, 121b) on both sides with the central axis Z interposed therebetween. In the X-axis cross section, the apex of the curved surface 12 (i.e., the site having the longest distance from the base surface 13) may be the intersection point 123 of the curved surface 12 and the central axis Z as shown in FIG. 1F, or may be other than the intersection point 123, for example, in the vicinity of the intersection point 123 as shown in FIG. 2B. Since the intersection point 123 of the curved surface 12 and the central axis Z is a site at which the strongest light reaches from the light emitting element as a light source, as shown in FIG. 2B, for example, a concave portion may be provided at the intersection point 123 to make a site other than the intersection point 123 be an apex, thereby further distributing the light.

In FIG. 2B, the apex in the X-axis cross section is the intersection point 123. Since the intersection point of the curved surface 12 and the central axis Z in the X-axis cross section and the intersection point of the curved surface 12 and the central axis Z in the Y-axis cross section are the same points, the distance from the base surface 13 to each portion in the Y-axis cross section and the X-axis cross section satisfies the following condition (2). In the following condition (2), $L_{X0}$ is the vertical distance from the intersection point of the central axis Z and the light emitting region (curved surface 12) to the base surface 13 in the X-axis cross section.

$$L_{Y0}=L_{X0} \quad (2)$$

As described above, the intersection point of the curved surface 12 and the central axis Z in the Y-axis cross section and the intersection point of the curved surface 12 and the central axis Z in the X-axis cross section are the same points 123. On the other hand, in the present embodiment, as shown in FIG. 2B, while the apex in the X-axis cross section is the intersection point 123, the apex of the Y-axis cross section is located not at the intersection point 123 but on both sides with the intersection point 123 interposed therebetween. Thus, in the luminous flux control member 10 shown in FIGS. 2A and 2B, the Y-axis cross section has an apex higher than that of the X-axis cross section. That is, the apex of the X-axis cross section and the apex of the Y-axis cross section satisfy, for example, the following condition (3).

$$L_{X0}=L_{Y0}<L_{Y1}=L_{Y1'} \quad (3)$$

As described above, in the luminous flux control member 10, the light emitting region (curved surface 12) is an elliptical shape and has a pair of first concave portions 121 with the central axis interposed therebetween in the short axis X-axis direction. As a result, when the light emitting element is covered with the luminous flux control member 10, incident light from the light emitting element is prone to be refracted and spread in the Y-axis direction greater than in the X-axis direction. The luminous flux control member 10 has a second concave portion 122 at the intersection point 123 in the Y axis cross section. That is, the luminous flux control member 10 does not have an apex on the optical axis in the Y axis cross section. As a result, in the luminous flux control member 10 of the present invention, for example, the light emitted from the light emitting element emitted at a predetermined solid angle with respect to the optical axis is spread by the base concave portion 131, and then further spread in the Y-axis direction by the second concave portion 122.

In the luminous flux control member 10, as described above, the degree of refraction for spreading light is greater in the Y-axis direction than in the X-axis direction. Therefore, when the light emitting element is covered with the luminous flux control member 10, incident light from the light emitting element can be refracted so as to be spread greater in the Y-axis direction than in the X-axis direction. Thus, the luminous flux control member 10 is preferably used, for example, in a light emitting element that emits isotropic light, and can be said to be a member for distributing light from the isotropic light emitting element in a deformed shape.

The material of the lens body 11 is not particularly limited, and is, for example, a material that transmits light. Examples of the material include glasses and transparent resins, and examples of the transparent resin include polymethylmethacrylate (PMMA), polycarbonate (PC), epoxy resins (EP), and silicone resins. When the luminous flux control member 10 further includes the leg portion 15 and the flange portion 14, these members can be molded integrally with the lens body 11, and for example, the materials of these members are the same as described above.

The size of the lens body 11 is not particularly limited. The lens body 11 has an elliptical shape as viewed from the central axis Z direction. The size of the ellipse can be represented by, for example, the length (X) of the X axis and the length (Y) of the Y axis with the short axis centered on the central axis Z of the lens body 11 being considered to be the X axis and the long axis centered on the central axis Z of the lens body 11 being considered to be the Y axis. The size of the ellipse is such that, when X is considered to be a relative value of 1, the lower limit of the relative value of Y exceeds 1, for example, and the upper limit of the relative value of Y is 3 or less, for example. The length of the X axis of the ellipse is, for example, 3 mm to 10 mm, and the length of the Y axis can be obtained from the relative value on the basis of the length of the X axis, for example.

The height of the entire lens body 11 is not particularly limited, and the length ($L_{Y0}$) from the base surface 13 to the intersection point 123 in the central axis Z is, for example, 2 mm to 9 mm. In the lens body 11, the size of the base concave portion 131 for covering the light emitting element provided on the base surface 13 is not particularly limited, and can be appropriately determined depending on the size of the light emitting element, for example. In the lens body 11, the sizes and shapes of the first concave portions 121 in the X-axis cross section and the second concave portion 122 in the Y-axis cross section are not particularly limited.

When the luminous flux control member 10 further includes the leg portion 15, for example, the number, position, and the like of the leg portions 15 are not particularly limited. The leg portion(s) 15 is disposed around the base concave portion 131, for example, on the base surface 13 of the lens body 11. The luminous flux control member 10 may include one or more leg portions 15, for example. In the case of including a plurality of leg portions 15, for example, the number of leg portions 15 is two or more or three or more. In the case of including a plurality of leg portions 15, for example, the leg portions 15 are preferably disposed on the same circumference about the central axis, and each of the leg portions 15 is disposed at the same angle (for example, 120° in the case of three) with respect to the center.

The shape and size of the leg portion 15 are not particularly limited. Examples of the shape of the leg portion 15 include a cylindrical shape and a prismatic shape. For example, the cross section of the leg portion 15 may have the same size in the vertical direction, or may be narrowed from the top to the bottom.

The leg portion 15 is disposed on the mounting substrate by an adhesive or the like at the distal end in the downward direction. Thus, the distal end of the leg portion 15 in the downward direction has a relatively small area, for example. This further helps to prevent the adhesive or the like from affecting the optical characteristics, for example, in the light emitting device in which the luminous flux control member of the present invention is disposed.

Second Embodiment

In the luminous flux control member of the present invention, the shape of the pair of first concave portions in the X-axis cross-sectional view is not particularly limited as described above. In the present embodiment, an example of the shape of the pair of first concave portions will be described with reference to FIG. 3.

Figure 3:
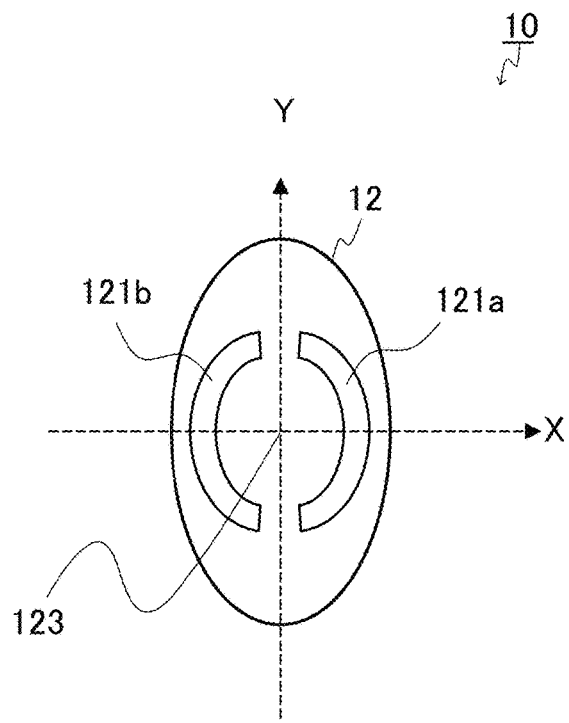
FIG. 3 is a top view of a luminous flux control member 10 according to the second embodiment.

FIG. 3 is a plan view of the luminous flux control member 10 as viewed from above, and is a schematic view showing a region in which the pair of first concave portions 121 are provided. As shown in FIG. 3, in the luminous flux control member 10, the first concave portions 121a and 121b are in the shape of symmetrical arcs about the Y axis in which the openings face each other as viewed from the central axis Z direction. The first concave portion 121*a* has a shape symmetrical about the X axis, and the first concave portion 121*b* is also have a shape symmetrical about the X axis. The first concave portions 121*a* and 121*b* are not present on the Y axis.

The size of the arc of each of the first concave portions 121*a* and 121*b*, the depth of each of the first concave portions 121*a* and 121*b*, and the like are not particularly limited, and can be appropriately determined depending on, for example, the size and shape of the luminous flux control member 10, the arrangement condition of the luminous flux control member 10, and the like.

Third Embodiment

The luminous flux control member of the present invention can be used in the light emitting device of the present invention. As described above, the light emitting device of the present invention includes a light emitting element and a luminous flux control member, and the luminous flux control member is the luminous flux control member of the present invention and is disposed (or mounted) so as to cover the light emitting element. Since the light emitting device of the present invention uses the luminous flux control member of the present invention, the luminous flux control member can spread light emitted from the light emitting element greater in the Y-axis direction than in the X-axis direction of the luminous flux control member. The light emitting device of the present invention is characterized in that it includes the luminous flux control member of the present invention, and other configurations are not limited in any way. The light emitting device of the present invention can also be referred to as a light emitting element substrate for a backlight, for example.

The light emitting device of the present invention further includes, for example, a mounting substrate, the light emitting element is disposed on the mounting substrate, and the light emitting element is covered with the luminous flux control member. In the light emitting device of the present invention, the numbers of the light emitting elements and the luminous flux control members are not particularly limited as long as one luminous flux control member is disposed so as to cover one light emitting element.

When the light emitting device of the present invention includes a plurality of the light emitting elements and a plurality of the luminous flux control members, the plurality of the light emitting elements are preferably disposed linearly on the mounting substrate at intervals to form a light emitting element row. As to the plurality of the light emitting elements forming the light emitting element row, one luminous flux control member is preferably covered with one luminous flux control member as described above. As to the direction of each of the luminous flux control members with respect to the light emitting element row, for example, the Y-axis direction of the luminous flux control member is preferably orthogonal to the row direction of the light emitting element row. The row direction of the light emitting element row means the direction in which the light emitting elements in the light emitting element row are arranged.

The light emitting element is not particularly limited as described above, and may be a point light source such as an LED. Since the luminous flux control member of the present invention can be a member for distributing light in a deformed shape as described above, the light emitting element preferably emits isotropic light.

Figure 4A:
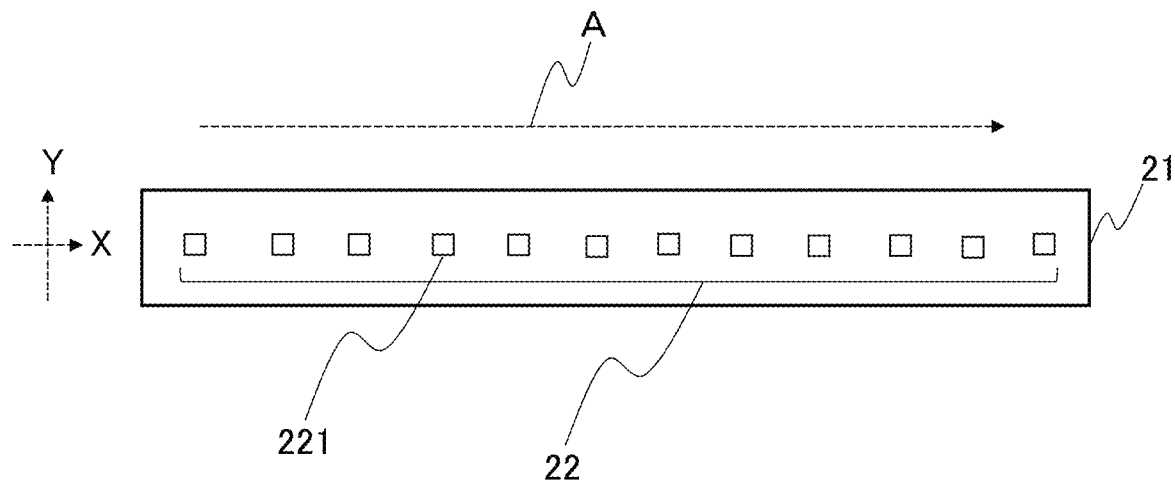
FIGS. 4A and 4B are schematic views of a light emitting device according to the third embodiment.
Figure 4B:
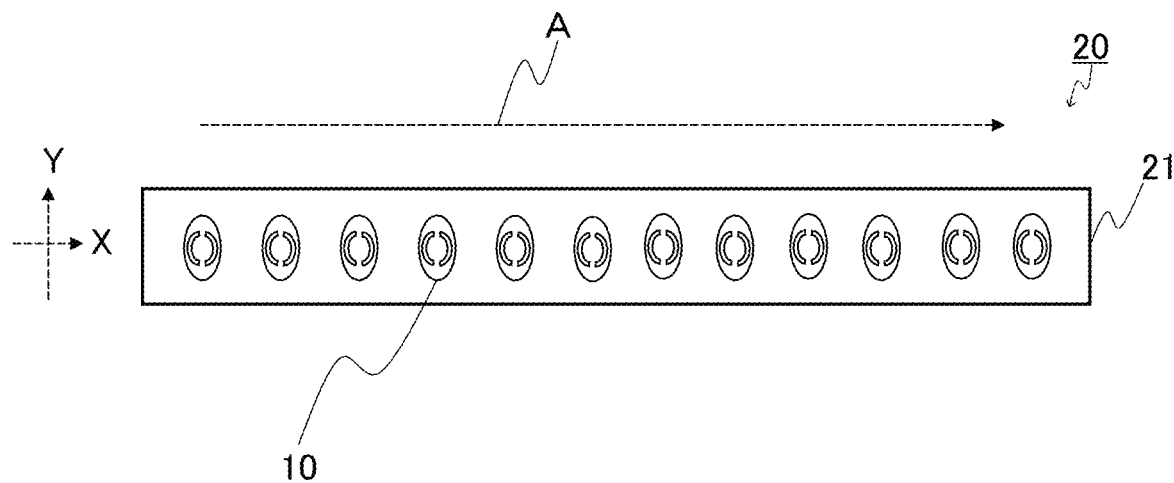

Next, an aspect of the light emitting device of the present invention having the light emitting element row will be described as an example with reference to FIGS. 4A and 4B. FIGS. 4A and 4B are schematic views showing the outline of the light emitting device 20. FIG. 4A is a plan view showing the outline of the mounting substrate 21 on which a plurality of light emitting elements 221 are disposed, and FIG. 4B is a schematic view showing the outline of the light emitting device 20 in which the luminous flux control members 10 are further disposed on the mounting substrate 21 so as to cover the light emitting elements 221.

As shown in FIG. 4A, on the mounting substrate 21, the plurality of light emitting elements 221 are disposed linearly at intervals to form a light emitting element row 22. In FIG. 4A, the direction (arrow A) of forming the light emitting element row 22 is referred to as a row direction A of the light emitting element row 22. As shown in FIG. 4B, each of the luminous flux control members 10 is disposed on the mounting substrate 21 so as to cover each of the light emitting elements 221 with the base concave portion 131, thereby forming the light emitting device 20.

In the light emitting element row 22, the pitch of the light emitting elements 221 is not particularly limited, and for example, the first concave portion 121 of the luminous flux control member 10 may be adjusted in accordance with the pitch of the light emitting elements 221, as described below. The pitch of the light emitting elements 221 can be determined appropriately depending on the thickness of the backlight, for example. As a specific example, the pitch can be 20 mm to 250 mm. The pitch of the light emitting elements 221 is, for example, the distance between the central axes of the adjacent light emitting elements 221.

When the light emitting device of the present invention includes the light emitting element row, the number of the light emitting element rows is not particularly limited. The light emitting device of the present invention may include, for example, one light emitting element row on one mounting substrate as shown in FIGS. 4A and 4B described above, or may include a plurality of light emitting element rows as shown in FIGS. 5A and 5B described below.

When one mounting substrate includes one light emitting element row as in the former case, the light emitting device of the present invention is also referred to as a light emitting element bar, for example, and when the light emitting element is an LED, the light emitting device is also referred to as an LED bar. When the light emitting device of the present invention includes a plurality of light emitting element rows as in the latter case, the light emitting element rows are preferably disposed so that their row directions A are parallel to each other, for example, as described below. Furthermore, among the light emitting element rows, the Y axes of the light emitting elements of adjacent light emitting element rows are preferably aligned on a straight line.

As described above, according to the luminous flux control member of the present invention, with respect to the display panel having the same size, the number of the light emitting element rows can be reduced as compared with the case of using conventional luminous flux control members, for example. As a specific example, FIGS. 5A, 5B, 7A, and 7B are schematic views showing a comparison between the case of using conventional luminous flux control members and the case of using the luminous flux control members of the present invention.

Figure 5A:
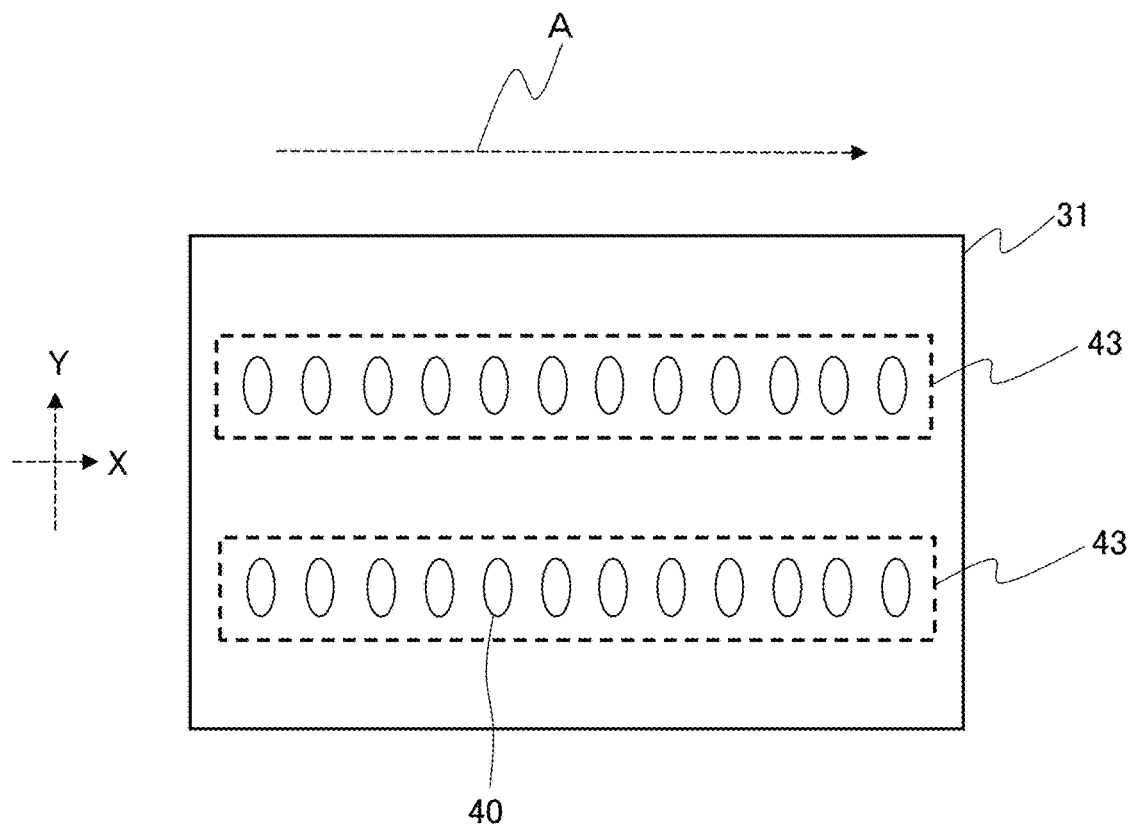
FIG. 5A is a schematic view showing the outline of the relationship between light emitting element rows in which conventional luminous flux control members are disposed and a display panel.
Figure 5B:
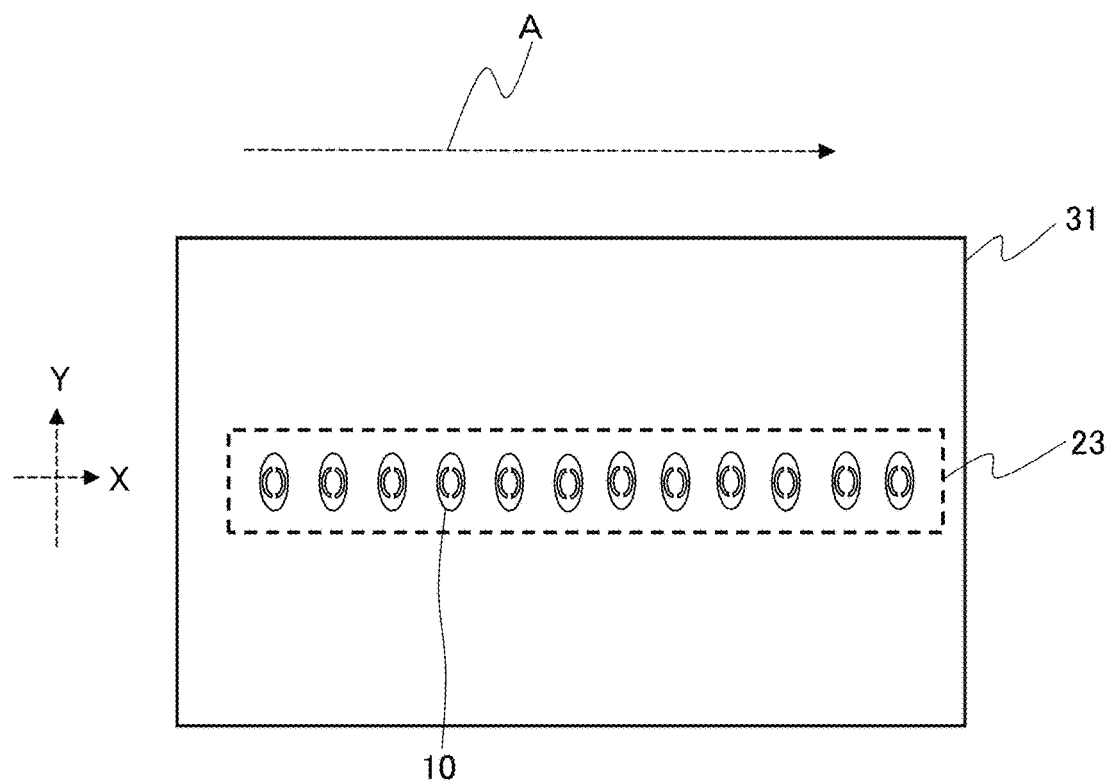
FIG. 5B is a schematic view showing the outline of the relationship between a light emitting element row in which the luminous flux control members 10 are disposed and a display panel in the third embodiment.

First, FIG. 5A shows the outline of the relationship between light emitting element rows 43 in which conventional luminous flux control members 40 are disposed and the display panel 31, and FIG. 5B shows the outline of the relationship between the light emitting element row 23 in which the luminous flux control members 10 are disposed and the display panel 31 in the present embodiment. In FIG. 5A, it is assumed that a plurality (two rows) of light emitting element rows 43 in which the light emitting elements are covered with the luminous flux control members 40 need to be disposed in order to spread light over the entire display panel 31 having a predetermined size. On the other hand, in the case of using the luminous flux control members 10 according to the present embodiment, since the luminous flux control member 10 refracts the light so as to be spread in the Y-axis direction greater than the X-axis direction, the number of the light emitting element rows 23 in which the light emitting elements are covered with the luminous flux control members 10 can be reduced, for example, to one row, as compared to the case of using the conventional luminous flux control members 40.

Figure 6:
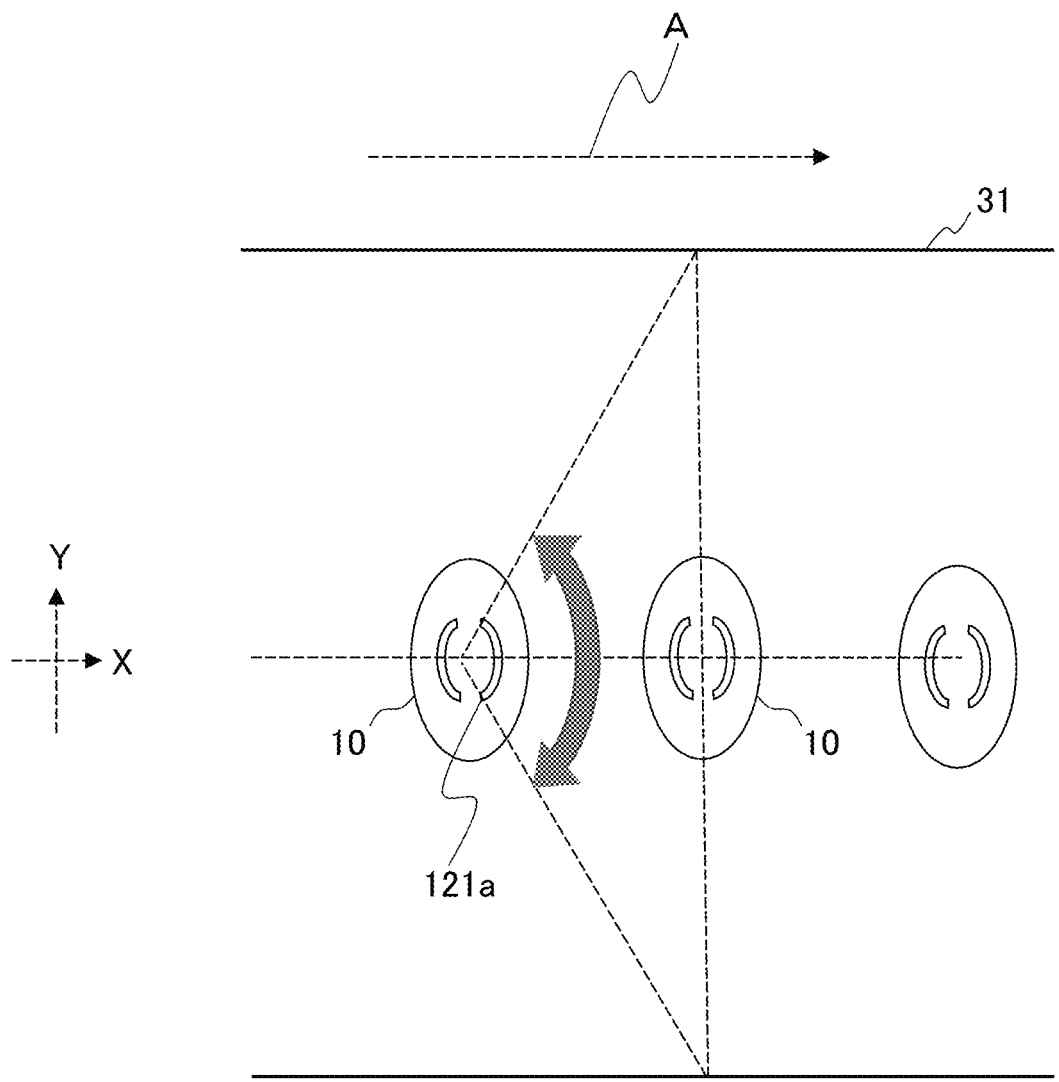
FIG. 6 is a schematic view showing the relationship between the luminous flux control members and the display panel in the third embodiment.

As shown in FIG. 5B, when the number of the light emitting element rows 23 in which the light emitting elements are covered with the luminous flux control members 10 disposed on the display panel 31 is one, the increase in the spread of light in the Y-axis direction can be adjusted, for example, by the size of the pair of first concave portions 121 of the luminous flux control member 10 in the X-axis cross section. The adjustment method will be described with reference to FIG. 6. FIG. 6 is a schematic view showing the relationship between the luminous flux control member 10 and the display panel 31. The first concave portion 121*a* has an arc shape as described above, and the spread of light in the Y-axis direction can be adjusted by, for example, the arc length. Specifically, in a triangle connecting the central axis of the luminous flux control member 10 (the left luminous flux control member 10 in FIG. 6) as the apex and the two intersection points of the Y axis of the adjacent luminous flux control member 10 (the middle luminous flux control member 10 in FIG. 6) with the end portions of the display panel 31, the arc length of the first concave portion 121*a* can be set within the range of the apex angle of the apex. As a result, the light is prone to be spread to the ends (the outer edges on the long sides) of the display panel 31. The arc length of the first concave portion 121*b* that is paired with the first concave portion 121*a* can be set in the same manner.

Figure 7A:
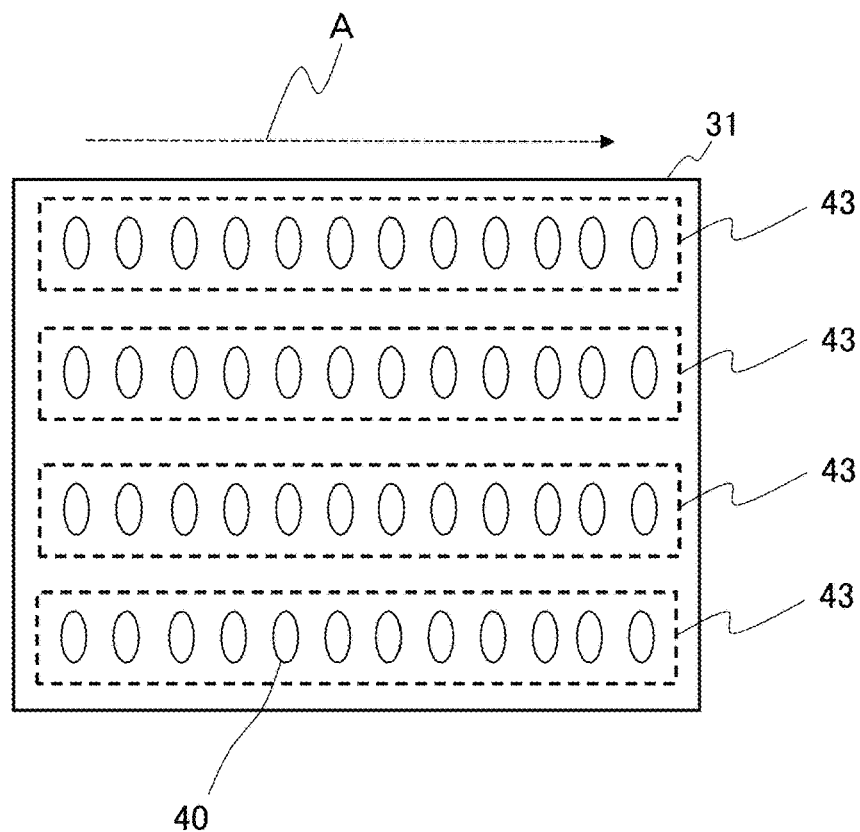
FIG. 7A is a schematic view showing the outline of the relationship between light emitting element rows in which conventional luminous flux control members are disposed and a display panel.
Figure 7B:
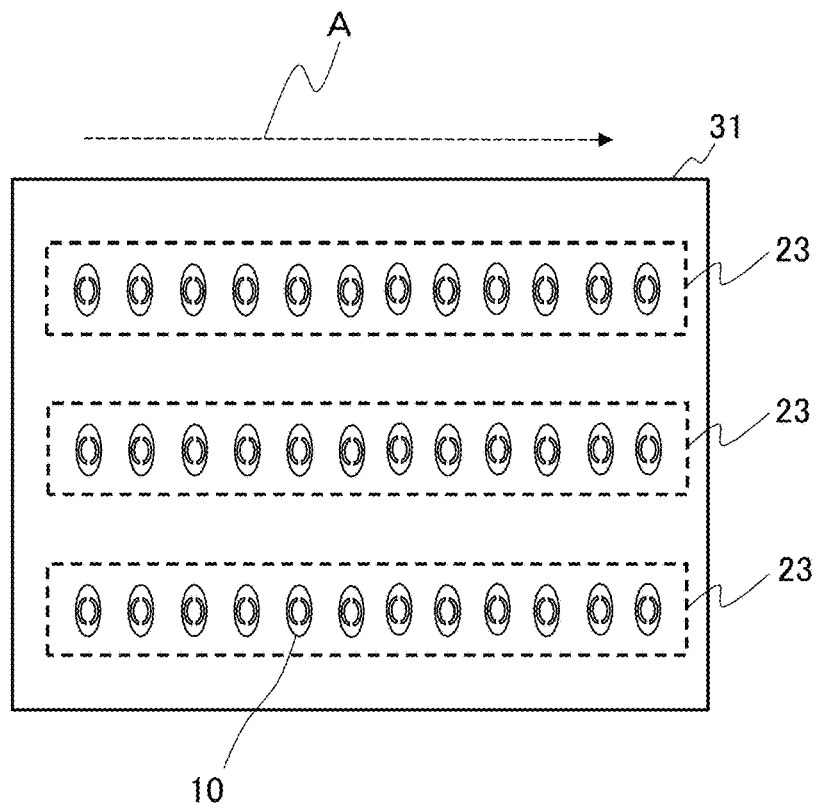
FIG. 7B is a schematic view showing the outline of the relationship between light emitting element rows in which the luminous flux control members 10 are disposed and a display panel (member to be irradiated) in the third embodiment.

Next, FIG. 7A shows the outline of the relationship between the light emitting element rows 43 in which the conventional luminous flux control members 40 are disposed and the display panel 31, and FIG. 7B shows the outline of the relationship between the light emitting element rows 23 in which the luminous flux control members 10 are disposed and the display panel (member to be irradiated) 31 in the present embodiment. In FIG. 7A, it is assumed that a plurality (four rows) of light emitting element rows 43 in which the light emitting elements are covered with the luminous flux control members 40 need to be provided in order to spread light over the entire display panel 31 having a predetermined size. On the other hand, in the case of using the luminous flux control members 10 according to the present embodiment, since the luminous flux control member 10 refracts the light so as to be spread in the Y-axis direction greater than the X-axis direction, the number of the light emitting element rows 23 in which the light emitting elements are covered with the luminous flux control members 10 can be reduced, for example, to three rows, as compared to the case of using the conventional luminous flux control members 40.

Figure 8:
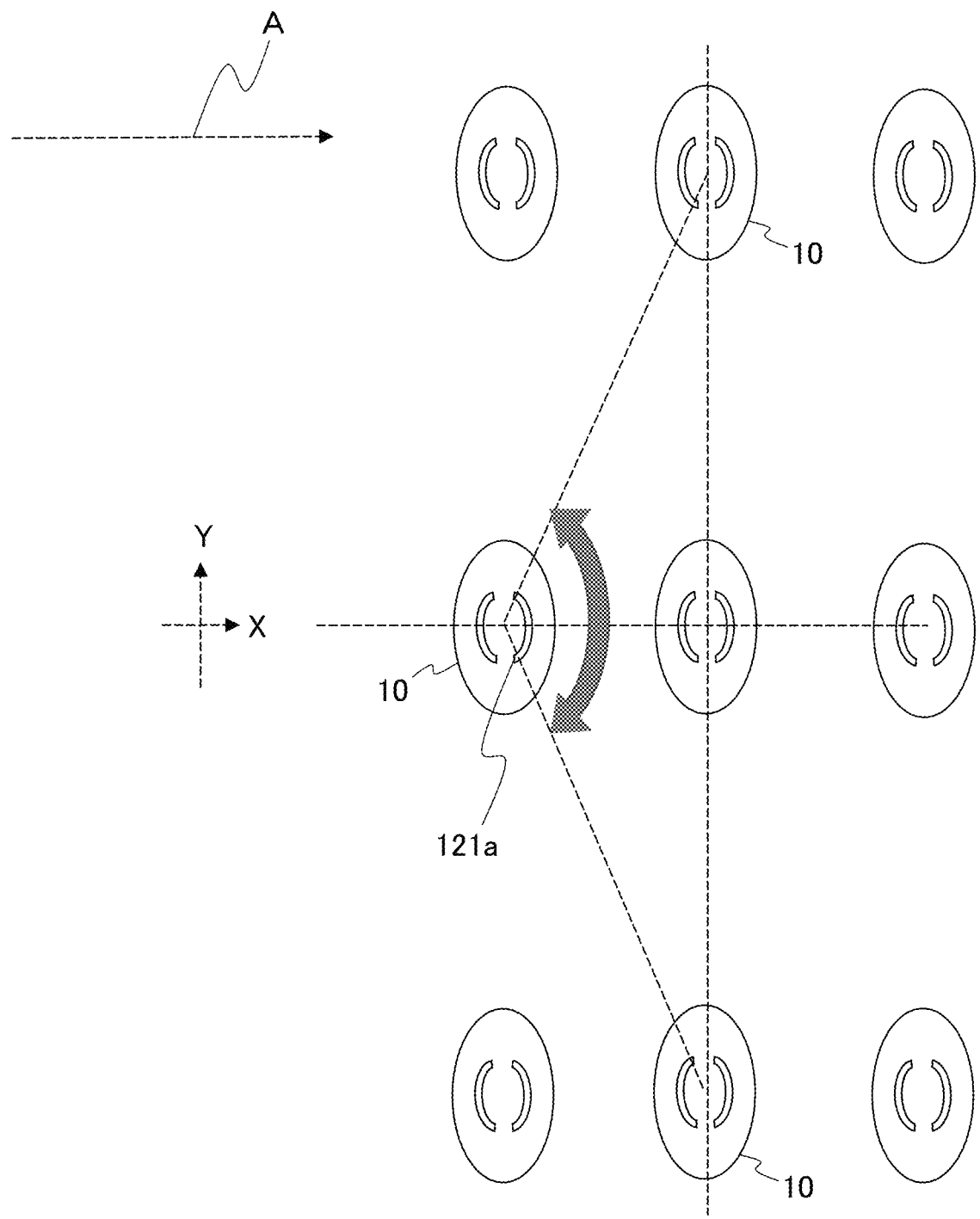
FIG. 8 is a schematic view showing the relationship between adjacent luminous flux control members in the third embodiment.

As shown in FIG. 7B, when the number of the light emitting element rows 23 in which the light emitting elements are covered with the luminous flux control members 10 disposed on the display panel 31 is three, increase in the spread of light in the Y-axis direction can be adjusted, for example, by the size of the pair of first concave portions 121 of the luminous flux control member 10 in the X-axis cross section. The adjustment method will be described with reference to FIG. 8. FIG. 8 is a schematic view showing the relationship between adjacent luminous flux control members 10. The first concave portion 121*a* has an arc shape as described above, and the spread of light in the Y-axis direction can be adjusted by, for example, the arc length. Specifically, in a triangle connecting the central axis of the luminous flux control member 10 (the luminous flux control member 10 on the left side in the middle row in FIG. 8) as the apex and the two intersection points of the Y axis of the adjacent luminous flux control member 10 (the luminous flux control member 10 at the center in the middle row in FIG. 8) in the same light emitting element row and the central axes of the luminous flux control members (the luminous flux control members 10 at the center in the upper row and at the center in the lower row in FIG. 8) next to the adjacent luminous flux control member 10 (the luminous flux control member 10 at the center in the middle row in FIG. 8) in adjacent light emitting element rows (the upper and lower rows in FIG. 8), the arc length of the first concave portion 121*a* can be set within the range of the apex angle of the apex. As a result, in the display panel 31, the light is prone to be spread between adjacent light emitting element rows. The arc length of the first concave portion 121*b* which is a pair of the first concave portion 121*a* can be set in the same manner.

Fourth Embodiment

The light emitting device of the present invention including the luminous flux control member of the present invention can be used, for example, in a surface light source device. As described above, the surface light source device of the present invention is characterized in that it includes the light emitting device of the present invention and a light diffusion member. The surface light source device of the present invention is characterized in that it includes the luminous flux control member of the present invention, and other configurations are not limited in any way.

In the surface light source device of the present invention, the number of the light emitting devices of the present invention is not particularly limited, and may be, for example, one or more. When the light emitting device includes a light emitting element row in which the light emitting elements are covered with the luminous flux control members, the number of light emitting element rows per light emitting device (the number of light emitting elements per mounting substrate) is not particularly limited, and may be, for example, one or more. When the surface light source device of the present invention includes a plurality of light emitting element rows in which the light emitting elements are covered with the luminous flux control members, the surface light source device may include, for example, a plurality of light emitting devices including one light emitting element row, or may include one light emitting device including a plurality of light emitting element rows. When the surface light source device of the present invention includes a plurality of light emitting element rows, it is preferable that the plurality of light emitting element rows be disposed so that their row directions are parallel to each other.

In the surface light source device of the present invention, the light diffusion member is not particularly limited, and for example, a member that diffuses and transmits light emitted from the light emitting device is preferable. The light diffusion member may be, for example, a diffusion plate, an optical film, or the like, and may be a combination thereof.

Further, the surface light source device of the present invention can be used, for example, as a light source of a display device. The display device of the present invention is characterized in that it includes the surface light source device of the present invention and a member to be irradiated with light emitted from the surface light source device.

In the display device of the present invention, the type of the member to be irradiated is not particularly limited, and may be, for example, a display panel. As a specific example, the member to be irradiated may be a liquid crystal panel or the like. When the member to be irradiated is the liquid crystal panel, the display device of the present invention may be referred to as a liquid crystal display device.

Fifth Embodiment

In the luminous flux control member of the present invention, the positions of the pair of first concave portions in the X-axis cross section can be determined, for example, in accordance with the pitch of the light emitting elements disposed in the light emitting device of the present invention, and in accordance with the distance between the mounting substrate and the light diffusion member in the surface light source device of the present invention.

Figure 9:
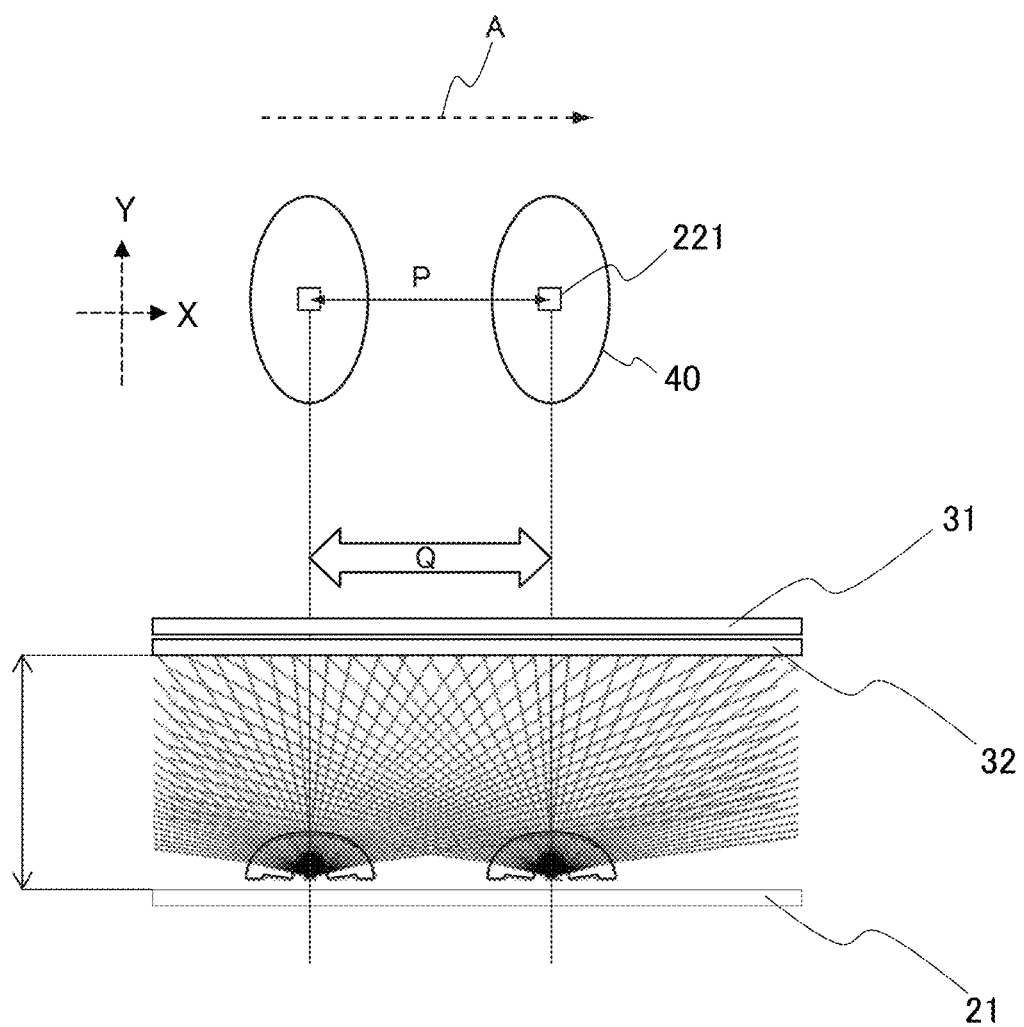
FIG. 9 is a schematic view showing the relationship between the pitch of the light emitting element and the emitted light in the fourth embodiment.

FIG. 9 schematically shows the relationship between the pitch P of the light emitting elements 221 in the X-axis direction and the light emitted from the light emitting elements 221. FIG. 9 shows the mounting substrate 21 on which the light emitting elements 221 are disposed, the light diffusion member 32 in the surface light source device, and the member to be irradiated (display panel) 31 in the display device. As shown in FIG. 9, light beams emitted from the light emitting elements 221 (light sources) adjacent to each other at a predetermined pitch P overlap with each other in a predetermined region Q in the X-axis direction between the light emitting elements 221 (i.e., in a range corresponding to the pitch P of the light emitting elements 221 on the surface light source device or the display device). Therefore, by distributing the overlapping light emitted in the X-axis direction from the light emitting elements 221 adjacent to each other in the X-axis direction to the region other than the region Q in the X-axis direction (for example, in the Y-axis direction), for example, as described above, the spread of the light in the Y-axis direction is made greater than that in the X-axis direction, thereby suppressing the overlap of the light in the region Q. Thus, in the curved surface of the luminous flux control member, it is preferable that the pair of first concave portions be provided in a region in which light reaching the range of the pitch P in the X-axis direction is spread in the Y-axis direction, for example. Further, in the surface light source device, for example, since the degree of overlap and the state of causing the bright spots due to the degree of overlap vary depending on the distance between the mounting substrate 21 of the light emitting element 221 and the light diffusion member 32, it is preferable that the pair of first concave portions be adjusted according to the situation.

While the present invention has been described above with reference to illustrative embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2017-138313 filed on Jul. 14, 2017. The entire subject matter of the Japanese Patent Applications is incorporated herein by reference.

INDUSTRIAL APPLICABILITY

As described above, the luminous flux control member of the present invention has the above-described configuration, whereby the degree of refraction for spreading light can be made greater in the Y-axis direction than that in the X-axis direction. Thus, for example, by disposing the luminous flux control members of the present invention so that the Y-axis directions thereof are along the direction in which the spread of light is required, rather than increasing the number of the light emitting elements, the spread of light can be ensured. Furthermore, as described above, when the number of the light emitting element rows disposed in parallel is reduced, it is required to increase the distance between the light emitting element rows. However, by disposing the luminous flux control members of the present invention so that the Y-axis directions thereof are along the direction in which the distance between the light emitting element rows is increased (perpendicular to the light emitting element rows), it is possible to further spread the light in the direction in which the distance between the light emitting element rows is increased. Therefore, for example, even when the number of the light emitting element rows is reduced, the light can be spread to a region where the amount of light is insufficient, thereby suppressing the dark spots to be caused.

REFERENCE SIGNS LIST 10 luminous flux control member
11 lens body
12 curved surface
121 first concave portion
122 second concave portion
123 intersection point
13 base surface
131 base concave portion
14 flange
15 leg portion
21 mounting substrate
22 light emitting element row
221 light emitting element
23 light emitting element row in which luminous flux control members are disposed
31 display panel (member to be irradiated)
32 light diffusion member

The invention claimed is:
1. A luminous flux control member comprising:
a dome shaped aspherical lens body, wherein
the lens body comprises:
  a base surface; and
  a dome shaped curved surface, wherein
the base surface has a base concave portion centered on a central axis,
a concave surface of the base concave portion has a light incident region for incident light emitted from a light emitting element,
the dome shaped curved surface has a light emitting region for emitting incident light from the light incident region to an outside,
the light emitting region of the curved surface has an elliptical shape as viewed from a central axis direction centered on the central axis, in which a length (X) in an

X-axis direction orthogonal to the central axis and a length (Y) in a Y-axis direction orthogonal to the central axis and an X axis satisfy X<Y, the light emitting region of the curved surface has a pair of first concave portions on both sides with the central axis interposed therebetween in a cross section including the X axis and the central axis, wherein the pair of first concave portions in the light emitting region are in the shape of symmetrical arcs about the Y axis in which openings face each other as viewed from the central axis direction, and the light emitting region of the curved surface has a second concave portion on the central axis in a cross section including a Y axis and the central axis.

2. The luminous flux control member according to claim 1, wherein a degree of refraction for spreading light is greater in the Y-axis direction than in the X-axis direction.

3. The luminous flux control member according to claim 1, wherein the light emitting region has an apex on the central axis in a cross section including the X axis and the central axis.

4. The luminous flux control member according to claim 1, wherein in the light emitting region, a distance from the base surface to each portion satisfies the following conditions (1) and (2):

$$L_{Y0} < L_{Y1} = L_{Y1'} \quad (1)$$

$$L_{Y0} = L_{X0} \quad (2)$$

$L_{Y0}$: a vertical distance from an intersection point of the central axis and the light emitting region to the base surface in a cross section including the Y axis and the central axis;

$L_{Y1}$ and $L_{Y1'}$: vertical distances from apexes present at symmetrical positions about the central axis to the base surface in a cross section including the Y axis and the central axis; and $L_{X0}$: a vertical distance from the intersection point of the central axis and the light emitting region to the base surface in a cross section including the X axis and the central axis.

5. The luminous flux control member according to claim 1, wherein the pair of first concave portions in the light emitting region are not present on the Y axis.

6. The luminous flux control member according to claim 1, wherein the lens body further comprises a leg portion, and
the leg portion is disposed on the base surface so as to project in a direction opposite to the curved surface.

7. A light emitting device comprising:
a light emitting element; and
a luminous flux control member, wherein
the luminous flux control member is the luminous flux control member according to claim 1, and
the luminous flux control member is disposed so as to cover the light emitting element.

8. The light emitting device according to claim 7 further comprising:
a mounting substrate, wherein
the light emitting element is disposed on the mounting substrate, and
the light emitting element is covered with the luminous flux control member.

9. The light emitting device according to claim 7, wherein the luminous flux control member is a member for distributing light from the light emitting element in a deformed shape, and the light emitting element is an element that emits isotropic light.

10. A surface light source device comprising:
a light emitting device; and
a light diffusion member, wherein
the light emitting device is the light emitting device according to claim 7.

11. The light emitting device according to claim 8, comprising:
a plurality of the light emitting elements; and
a plurality of the luminous flux control members, wherein
the plurality of the light emitting elements are disposed linearly on the mounting substrate at intervals to form at least one light emitting element row,
each of the plurality of the light emitting elements is covered with each of the plurality of the luminous flux control members, and
a Y-axis direction of each of the plurality of the luminous flux control members is orthogonal to a row direction of the light emitting element row.

12. The surface light source device according to claim 10, wherein
the light emitting device further comprises a mounting substrate, wherein
the light emitting element is disposed on the mounting substrate,
the light emitting element is covered with the luminous flux control member,
the light emitting device further comprises:
a plurality of the light emitting elements; and
a plurality of the luminous flux control members, wherein
the plurality of the light emitting elements are disposed linearly on the mounting substrate at intervals to form at least one light emitting element row,
each of the plurality of the light emitting elements is covered with each of the plurality of the luminous flux control members, and
a Y-axis direction of each of the plurality of the luminous flux control members is orthogonal to a row direction of the light emitting element row,
the light emitting device includes a plurality of the light emitting element rows, and
the plurality of the light emitting element rows are disposed so that their row directions are parallel to each other.

13. A display device comprising:
a surface light source device; and
a member to be irradiated with light emitted from the surface light source device, wherein
the surface light source device is the surface light source device according to claim 10.

14. The surface light source device according to claim 10, wherein
the luminous flux control member is a member for distributing light from the light emitting element in a deformed shape, and the light emitting element is an element that emits isotropic light,
the light emitting device includes a plurality of the light emitting element rows, and
the plurality of the light emitting element rows are disposed so that their row directions are parallel to each other.

15. The display device according to claim 13, wherein the member to be irradiated is a display panel.

\* \* \* \* \*